United States Patent
Carr

(10) Patent No.: US 6,399,000 B1
(45) Date of Patent: Jun. 4, 2002

(54) METHOD OF MANUFACTURING A BODY OF INSULATING MATERIAL

(75) Inventor: Geoffrey John Richard Carr, Wallasey (GB)

(73) Assignee: Microtherm International Limited (GB)

(*) Notice: Subject to any disclaimer, the term of this patent is extended or adjusted under 35 U.S.C. 154(b) by 0 days.

(21) Appl. No.: 09/567,657

(22) Filed: May 9, 2000

(30) Foreign Application Priority Data

May 11, 1999 (GB) ................................ 9910766

(51) Int. Cl.$^7$ ............................................. B29C 43/18

(52) U.S. Cl. ............................................. 264/112

(58) Field of Search ........................................... 264/112

(56) References Cited

U.S. PATENT DOCUMENTS

| 3,962,014 A | * | 6/1976 | Hughes et al. | ............ 156/306.3 |
| 5,211,785 A | * | 5/1993 | Hughes | ................ 156/242 |
| 5,486,323 A | * | 1/1996 | McWilliams | ............... 264/109 |

* cited by examiner

Primary Examiner—Mary Lynn Theisen
(74) Attorney, Agent, or Firm—Ira S. Dorman

(57) ABSTRACT

A non-planar formed body of particulate thermal insulating material is made by a method in which particulate insulating material is introduced into a porous envelope (1) and the envelope with the particulate insulating material is located in a forming means (2, 3). The forming means is operated such that compaction of the particulate material in the envelope is effected into a body of desired non-planar form, accompanied by a downwardly-directed flow of the particulate material towards at least one edge (7, 8) of the body (4). In this way a required density distribution of compacted material in the body is achieved.

13 Claims, 3 Drawing Sheets

METHOD OF MANUFACTURING A BODY OF INSULATING MATERIAL

This invention relates to a method of manufacturing a non-planar formed body, such as a panel of bent or curved form, of particulate thermal insulating material which may be microporous thermal insulating material.

BACKGROUND TO THE INVENTION

The term 'microporous' is used herein to identify porous or cellular materials in which the ultimate size of the cells or voids is less than the mean free path of an air molecule at NTP, i.e. of the order of 100 nm or smaller. A material which is microporous in this sense will exhibit very low transfer of heat by air conduction (that is collisions between air molecules). Such microporous materials include aerogel, which is a gel in which the liquid phase has been replaced by a gaseous phase in such a way as to avoid the shrinkage which would occur if the gel were dried directly from a liquid. A substantially identical structure can be obtained by controlled precipitation from solution, the temperature and pH being controlled during precipitation to obtain an open lattice precipitate. Other equivalent open lattice structures include pyrogenic (fumed) and electro-thermal types in which the average ultimate particle size is less than 100 nm. Any of these materials, based for example on silica, alumina or other metal oxides, may be used to prepare a composition which is microporous as defined above.

DESCRIPTION OF PRIOR ART

It is known, for example from GB-A-1350661, to make planar formed bodies of panel form by introducing dry particulate insulating material into a porous envelope which is then located between planar dies in a press. The press is operated to effect compaction of the particulate material in the envelope into a planar panel.

EP-A-0470723 is directed to the manufacture of non-planar formed bodies of particulate thermal insulating material. Reference is made to the method of GB-A-1350661 but it is stated that this method is not capable of producing non-planar formed bodies. Accordingly, a method is proposed in which a plane panel of compacted dry particulate insulating material is first formed. The plane panel is then disposed in contact with a covering means, such as glass cloth, between appropriate non-planar dies of a forming press. The press is operated and the panel is moulded by the dies into the desired non-planar form.

This method is disadvantageous in that it requires at least two stages and cracks may form in the panel during moulding of the plane panel into the desired non-planar form.

OBJECT OF THE INVENTION

It is an object of the present invention to provide an economical method of manufacturing non-planar formed bodies of thermal insulating material.

We have found that it is possible to manufacture non-planar formed bodies by compacting particulate insulating material contained in a porous envelope between appropriate non-planar dies in a forming means, such as a press, provided special attention is given to the flow of the particulate insulating material during compaction thereof.

SUMMARY OF THE INVENTION

Accordingly, the present invention provides a method of manufacturing a non-planar formed body of particulate thermal insulating material comprising:

introducing particulate insulating material into a porous envelope;

locating the envelope with the particulate insulating material in a forming means; and operating the forming means such that compaction of the particulate material in the envelope is effected into a body of desired non-planar form, accompanied by a downwardly-directed flow of the particulate material towards at least one edge of the body, to achieve a required density distribution of compacted material in the body.

The particulate thermal insulating material may be microporous thermal insulating material.

The forming means may comprise upper and lower forming dies shaped according to the desired form of the body.

The lower forming die may incorporate an elevated region and at least one peripheral region lower than the elevated region.

The lower forming die may be of elongate arched, humped or convex form. Such a form may be an elongate form corresponding to part of the surface of a cylinder (i.e. curved in one direction and rectilinear in the orthogonal direction), or may be an elongate form having a cross section corresponding substantially to an inverted V.

The upper forming die may be substantially complementary in contour to the lower forming die.

The forming dies may be incorporated in a press.

The downwardly-directed flow of the particulate thermal insulating material during compacting thereof may be towards two opposite edges of the body.

The non-planar formed body may comprise a curved or bent panel.

The porous envelope may comprise glass or ceramic cloth, or textile cloth of organic and/or inorganic material, or metal cloth, or perforated metal or plastics foil.

The invention is now described by way of example with reference to the accompanying drawings in which:

DESCRIPTION OF PREFERRED EMBODIMENTS

Figure 1:
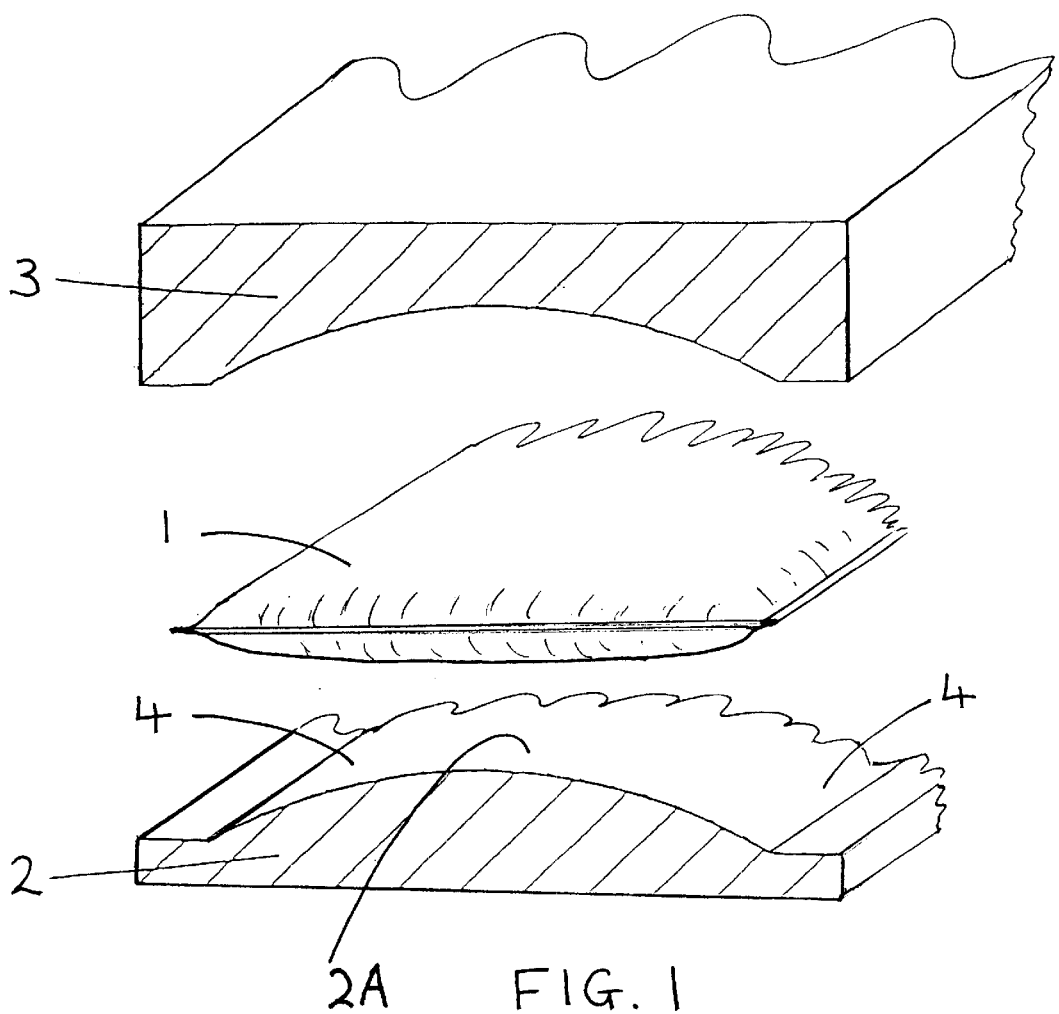
FIG. 1 is a perspective view of particulate thermal insulating material in a porous envelope located between upper and lower forming dies.

Referring to FIG. 1, dry particulate microporous insulating material of well known form is introduced into a porous envelope of well known form which is then closed.

The porous envelope with the microporous insulating material therein is denoted by reference numeral 1.

The porous envelope may suitably comprise a woven or non-woven fabric such as glass or ceramic cloth, or textile cloth of organic and/or inorganic material, or metal cloth. Alternatively the envelope may comprise a perforated metal or plastics foil.

The particulate microporous insulating material may, for example, comprise microporous silica which may be mixed with an opacifier, such as titanium dioxide or other known material, and reinforcing fibres or filaments. Such materials are very well known to the skilled person.

The envelope containing the particulate insulating material and designated by reference numeral 1 is located between a lower forming die 2 and an upper forming die 3 incorporated in a well known form of press.

The lower forming die 2 is of elongate arched, humped or convex form, corresponding to part of the surface of a cylinder (i.e. curved in one direction and rectilinear in the orthogonal direction). The lower forming die 2 therefore incorporates an elevated region 2A and peripheral regions 4 lower than the elevated region.

The upper forming die 3 has a contour substantially complementary to that of the lower forming die 2. Both dies may be formed of metal, although other materials could be considered.

Figure 2:
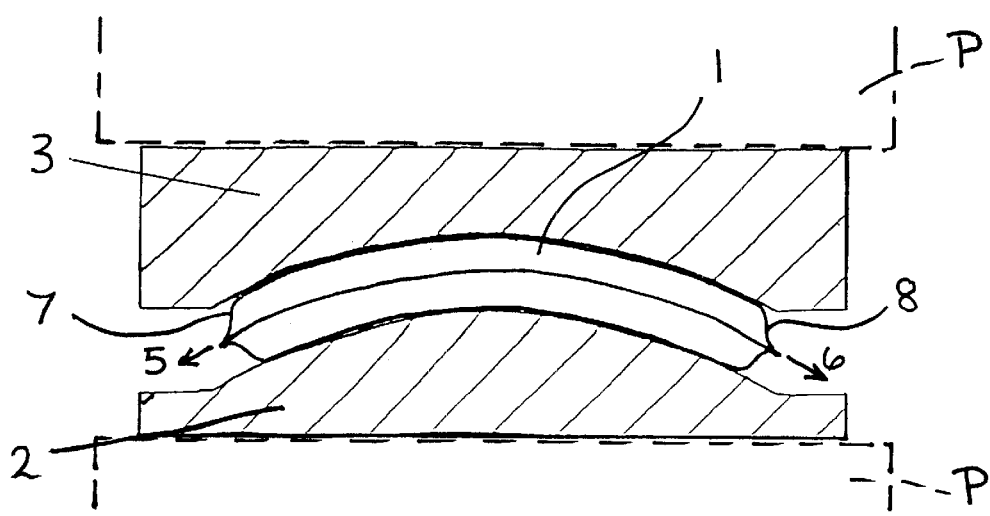
FIG. 2 is a sectional view of the arrangement of FIG. 1 after compacting the insulating material in the porous envelope between the upper and lower forming dies to form a curved panel.

The press is operated and the particulate insulating material in the envelope is compacted as shown in FIG. 2 to form a curved panel 1, the press being indicated by references P. During compaction, the particulate insulating material is caused to flow in a downwards direction as indicated by arrows 5 and 6 in FIG. 2 and towards two opposite edges 7, 8 of the resulting panel 1. Such flow of the particulate material is essential to the success of the process and is required to achieve a required density distribution of the compacted material in the body. Such density distribution should ideally be uniform. However, in practice, the density will generally be somewhat higher at the centre of the panel than at the edges.

Figure 3:
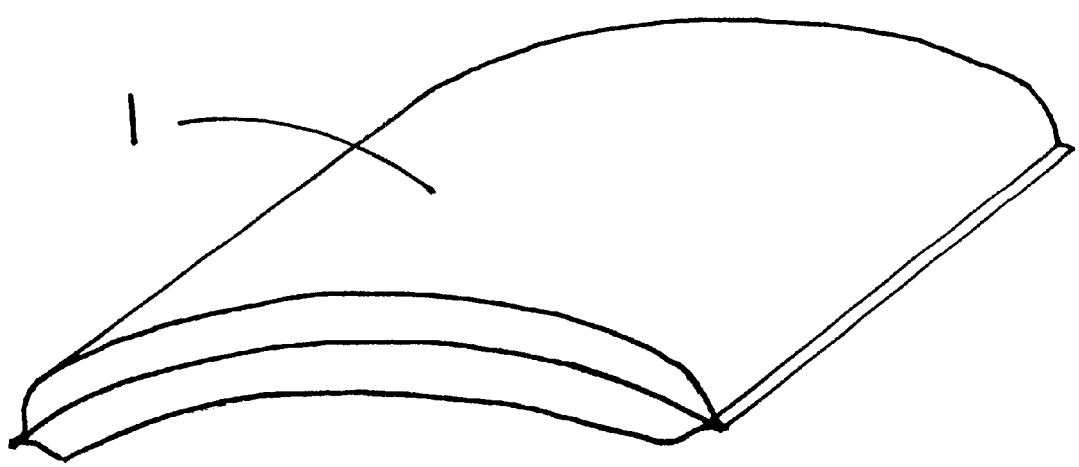
FIG. 3 is a perspective view of the curved panel after removal from the forming dies of FIG. 2.

The resulting curved panel 1 is then removed from between the dies 2, 3 and has the form shown in FIG. 3.

Figure 4:
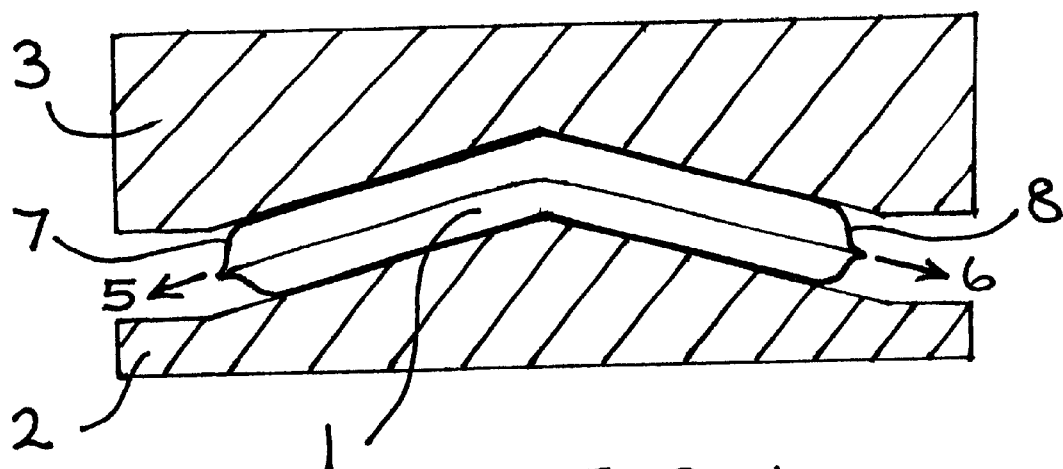
FIG. 4 is a sectional view showing alternative contours to the upper and lower forming dies of FIGS. 1 and 2, to form a bent or V-shaped panel.
Figure 5:
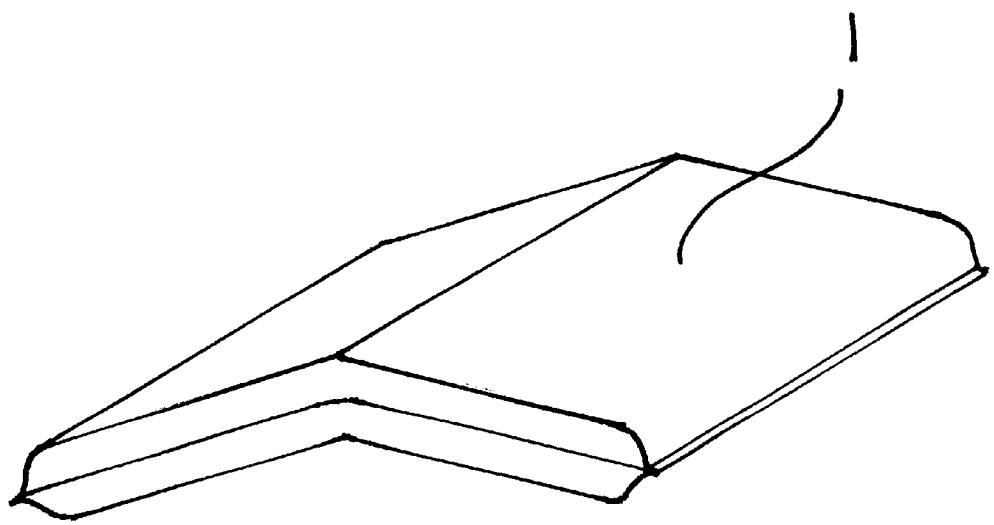
FIG. 5 is a perspective view of the bent or V-shaped panel after removal from the forming dies of FIG. 4.

Other shapes of non-planar panels may be produced by providing alternative contours for the lower 2 and upper 3 forming dies. For example, as shown in FIGS. 4 and 5 a bent or V-shaped panel 1 is produced by providing the elongate lower and upper forming dies 2, 3 with complementary V-shaped contours. The procedure is otherwise the same as described with reference to FIGS. 1 and 2, with a downwardly-directed flow of particulate insulating material taking place during compacting, in the directions of arrow 5 and 6 towards opposite edges 7, 8 of the panel.

I claim:

1. A method of manufacturing a non-planar formed body of particulate thermal insulating material comprising:

introducing particulate insulating material into a porous envelope;

locating the envelope with the particulate insulating material in a forming means; and operating the forming means such that compaction of the particulate material in the envelope is effected into a body of desired non-planar form, accompanied by a downwardly-directed flow of the particulate material towards at least one edge of the body, to achieve a required density distribution of compacted material in the body.

2. A method according to claim 1, wherein the particulate thermal insulating material is microporous thermal insulating material.

3. A method according to claim 1, wherein the forming means comprises upper and lower forming dies shaped according to the desired form of the body.

4. A method according to claim 3, wherein the lower forming die incorporates an elevated region and at least one peripheral region lower than the elevated region.

5. A method according to claim 4, wherein the lower forming die is elongate and is selected from arched, humped and convex form.

6. A method according to claim 5, wherein the form of the lower forming die is an elongate form corresponding to part of the surface of a cylinder.

7. A method according to claim 5, wherein the form of the lower forming die is an elongate form having a cross section corresponding substantially to an inverted V.

8. A method according to claim 3, wherein the upper forming die is substantially complementary in contour to the lower forming die.

9. A method according to claim 3, wherein the forming dies are incorporated in a press.

10. A method according to claim 1, wherein the downwardly-directed flow of the particulate thermal insulating material during compacting thereof is towards two opposite edges of the body.

11. A method according to claim 1, wherein the non-planar formed body comprises a curved panel.

12. A method according to claim 1, wherein the non-planar formed body comprises a bent panel.

13. A method according to claim 1, wherein the porous envelope is selected from glass cloth, ceramic cloth, textile cloth of organic material, textile cloth of inorganic material, metal cloth, perforated metal and plastics foil.

* * * * *